(No Model.)

R. K. COOKE, Jr.
PIPE HANGER.

No. 437,482. Patented Sept. 30, 1890.

Witnesses:
D. H. Hayward
C. L. Sundgren

Inventor:
Richard K. Cooke, Jr.
by his attorneys
Brown & Griswold

UNITED STATES PATENT OFFICE.

RICHARD K. COOKE, JR., OF NEW YORK, N. Y.

PIPE-HANGER.

SPECIFICATION forming part of Letters Patent No. 437,482, dated September 30, 1890.

Application filed January 4, 1890. Serial No. 335,850. (No model.)

*To all whom it may concern:*

Be it known that I, RICHARD K. COOKE, Jr., of New York, in the county and State of New York, have invented a certain new and useful Improvement in Pipe-Hangers, of which the following is a specification.

My improvement relates to hangers in which steam or other pipes may be supported.

I will describe in detail a pipe-hanger embodying my improvement, and then point out the novel features in claims.

Figure 1:
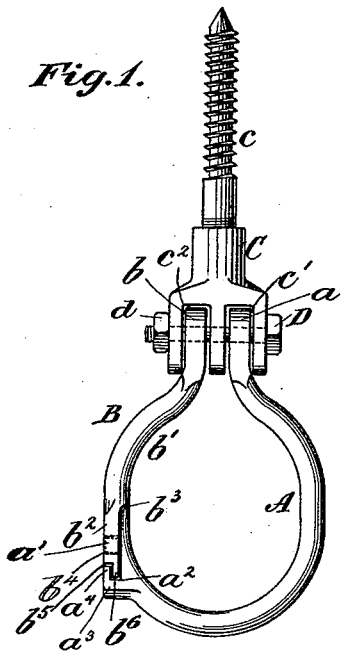
Figure 2:
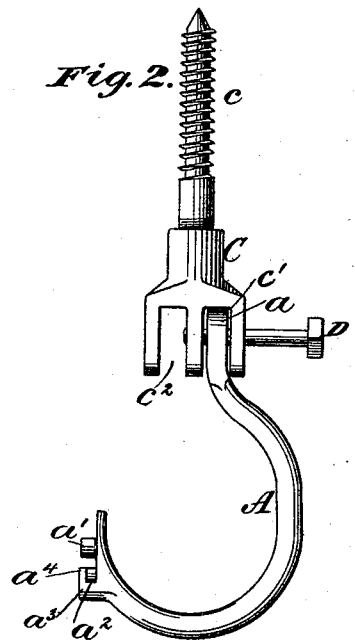
Figure 3:
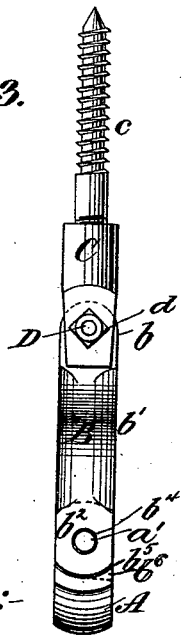
Figure 4:
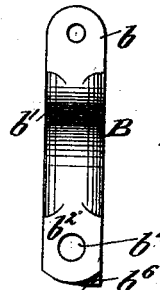

In the accompanying drawings, Figure 1 is a side elevation of a pipe-hanger embodying my improvement. Fig. 2 is a similar view showing one of the members of the hanger removed. Fig. 3 is an edge view of the same, showing the portion which is removed from Fig. 2 in position. Fig. 4 is a detail of said removable member.

Similar letters of reference designate corresponding parts in all the figures.

A hanger embodying my improvement comprises two members A B. The member A is hook-shaped. Its upper end portion $a$, or that portion corresponding to the shank of the hook, is provided with a transversely-extending aperture. The portion of the member A near the extremity of the hook and upon the exterior thereof is provided with a pin or projection $a'$. Beneath this pin or projection is a recess $a^2$, formed in an outwardly-projecting portion $a^3$ of the hook. An upwardly-projecting rim or flange $a^4$ on the projecting portion $a^3$ forms the outer wall of the recess $a^2$.

The member B of the hanger is provided with a shank-like portion $b$, similar to the shank-like portion $a$ of the member A. Below the shank-like portion it is somewhat curved, as at $b'$, and below the curved portion $b'$ is a substantially straight portion $b^2$. Near its lower extremity and upon its inner side the member B is provided with a recess $b^3$. Extending transversely through the lower or straight portion of the member B is an aperture $b^4$. Below the aperture $b^4$ there is formed a notch $b^5$, and extending below the notch $b^5$ is a lip or lug $b^6$.

C designates a support for the members A B of the hanger. This support is provided at its upper end, as shown, with a screw $c$, which may engage with a beam. Its lower end has two bifurcations $c'$ $c^2$, into which bifurcations the upper or shank portions $a$ $b$ of the members A B are inserted.

D designates a bolt provided with a nut $d$. This bolt is adapted to be passed through suitably-formed apertures in the bifurcated portions of the supports C, and also through the apertures previously referred to in the shank portions of the members A B, thus securing the said members upon the support C.

When it is desired to arrange a pipe in the support, the nut $d$ of the bolt is removed and the bolt is drawn backwardly into the position shown more clearly in Fig. 2, whereby the member B will be released from the bolt. By then swinging the member B downwardly it will turn upon the pin or projections $a'$, which extend through the apertures $b^4$, and the lip or lug $b^6$ will be moved out of the recess $a^2$. The member B may thus be readily removed. The pipe is then passed through the opening between the support C and the hook end of the member A and is dropped into the hook portion of said member. It is to be observed that the member A thus constitutes a hanger having an open side. The member B is now again placed in position by passing it onto the pin or projection $a$, rocking it so that the lip or lug $b^6$ will extend into the recess $a^2$, and again adjusting the bolt and applying the nut.

It will be seen that the flange $a^4$ on the projection $a^3$ operates as a stop to prevent lateral displacement of the member B in one direction, while the pin or projection $a'$ operates as a stop to prevent this lateral displacement in the other direction.

What I claim as my invention, and desire to secure by Letters Patent, is—

1. In a pipe-hanger, the combination, with a suitable support, of an open-sided hook constituting one member of the hanger and forming in itself a pipe-support, and a second member detachably connected to said first-named member and having its lower end interlocked with the end of the first member, so as to resist downward strain, both said members being secured to said support at their upper ends, substantially as set forth.

2. In a pipe-hanger, the combination, with a suitable support, of an open-sided hook constituting one member of the hanger, a second member adapted to close the opening at the side of the first member, these members being provided at their meeting ends the one with a laterally-projecting stud and recess and the other with an opening to receive the stud and with a lip to engage the recess, and means for connecting the upper ends of the members to the support, substantially as set forth.

3. In a pipe-hanger, the combination, with a support provided at its lower end with a double bifurcation, of a hook-shaped member of the hanger, and a second member having an interlocking engagement with the first member, the upper ends of the members being adapted to enter the bifurcations in the support, and means for locking the members in the support, substantially as set forth.

RICHARD K. COOKE, JR.

Witnesses:
FREDK. HAYNES,
GEORGE BARRY.